United States Patent
Bharathan et al.

[11] Patent Number: 5,417,052
[45] Date of Patent: May 23, 1995

[54] HYBRID SOLAR CENTRAL RECEIVER FOR COMBINED CYCLE POWER PLANT

[75] Inventors: Desikan Bharathan, Lakewood; Mark S. Bohn, Golden; Thomas A. Williams, Arvada, all of Colo.

[73] Assignee: Midwest Research Institute, Kansas City, Mo.

[21] Appl. No.: 147,625

[22] Filed: Nov. 5, 1993

[51] Int. Cl.⁶ ............................................. F02C 6/00
[52] U.S. Cl. ........................... 60/39.02; 60/39.33; 60/641.14; 165/104.19
[58] Field of Search ........... 60/39.02, 39.182, 39.33, 60/641.8, 641.12, 641.14, 641.15, 689; 165/104.11, 104.15, 104.17, 104.19, 104.21, 104.26

[56] References Cited

U.S. PATENT DOCUMENTS

| | | | |
|---|---|---|---|
| 4,067,315 | 1/1978 | Fehlner et al. | 165/104.26 |
| 4,094,148 | 6/1978 | Nelson . | |
| 4,116,266 | 9/1978 | Sawata et al. | 165/104.26 |
| 4,167,856 | 9/1979 | Seidel et al. | 60/39.33 |
| 4,189,922 | 2/1980 | Bellofatto | 60/641 |
| 4,259,836 | 4/1981 | Finckh . | |
| 4,438,630 | 3/1984 | Rowe . | |
| 4,466,423 | 8/1984 | Dolan et al. . | |
| 4,509,333 | 4/1985 | Nussdorfer et al. | 60/203.1 |
| 4,727,930 | 3/1988 | Bruckner et al. | 165/104.17 |
| 4,932,204 | 6/1990 | Pavel et al. . | |
| 4,942,736 | 7/1990 | Bronicki | 60/641.12 |

FOREIGN PATENT DOCUMENTS 105606 8/1979 Japan ....................... 60/641.14

Primary Examiner—Louis J. Casaregola
Attorney, Agent, or Firm—Edna M. O'Connor

[57] ABSTRACT

A hybrid combined cycle power plant including a solar central receiver for receiving solar radiation and converting it to thermal energy. The power plant includes a molten salt heat transfer medium for transferring the thermal energy to an air heater. The air heater uses the thermal energy to preheat the air from the compressor of the gas cycle. The exhaust gases from the gas cycle are directed to a steam turbine for additional energy production.

13 Claims, 1 Drawing Sheet

HYBRID SOLAR CENTRAL RECEIVER FOR COMBINED CYCLE POWER PLANT

CONTRACTUAL ORIGIN OF THE INVENTION

The United States Government has rights in this invention under Contract No. DE-AC02-83CH10093 between the U.S. Department of Energy and the National Renewable Energy Laboratory, a Division of Midwest Research Institute.

BACKGROUND OF THE INVENTION

The instant invention relates to the use of a hybrid central receiver with a natural gas combined cycle power generating system. The system of the instant invention uses solar energy to supplement the operation of the natural gas combined cycle system by using the solar generated heat to preheat the combustion air. The solar generated heat is transferred to the natural gas cycle by an air/molten salt heat exchanger or air heater.

Combined cycle power plants which include a steam turbine to utilize waste heat from the gas turbine are well known. Typically such a plant includes a combustion turbine driving an electric generator, a heat recovery steam generator which receives exhaust gas from the combustion turbine, and a steam turbine driven by superheated steam for driving another electrical generator or for achieving other well known functions. The steam turbine is located in a closed loop connecting the inlet and outlet of the heat recovery steam generator. Such a combined cycle power plant is shown in U.S. Pat. No. 4,932,204 to Pavel et al.

The Pavel et al patent, however is not concerned with the use of a central receiver or the use of solar energy to preheat the air supplied to a combustion turbine. Rather, the patent adjusts the flow rate of feed water through an economizer section of a heat recovery steam generator to provide an excess flow which is used to preheat the fuel delivered to a combustion turbine.

Solar thermal central receiver power plants are also well known. Such power plants are large and currently costly to build, and thus such technology has not carried forth into development on a commercial scale. Designs for such plants have been known to use a central receiver which has the potential to be a very cost-effective solar technology for generating electricity. The most preferred well known central receiver design utilizes a tube-type receiver, molten salt as a heat transfer medium, and a steam turbine to convert the absorbed heat into electricity. Such a system is extremely expensive to build and will result in relatively high energy costs. The known system designs do not contemplate using a central receiver in a hybrid plant having a high-efficiency combined cycle (a gas turbine plus a steam turbine to utilize waste heat from the gas turbine).

A solar thermal power plant is also described in U.S. Pat. No. 4,167,856 to Seidel et al. This patent discloses an open air circuit wherein the effective heat obtained from solar energy is supplied to the air flow between a compressor and an expansion machine. This power plant utilizes a solar heater exposed directly to solar radiation. Thus the use of a heat transfer medium such as molten salt is not contemplated. Also, the reference is not directed to a combined cycle plant configuration nor does it recognize that such a combined cycle plant would result in cost savings when utilized with a central receiver. The reference does use the solar heater to directly heat air prior to combustion, but an additional air preheater is also required to preheat the air before it is directed into the compressor.

Another example of utilizing solar heat to preheat the air prior to combustion is shown in U.S. Pat. No. 4,259,836 to Finckh et al. As described by this patent, the solar energy function can be selectively disconnected from the gas turbine for conventional operation. Again the reference refers to direct preheating without the use of a central receiver and heat transfer medium. Also, the reference is not directed to a combined cycle power plant.

In the past, molten salt has been used as a heat transfer medium. For such a use the temperature of the molten salt is kept sufficiently high to keep the salt in its molten form, generally above 500° F. Both U.S. Pat. No. 4,094,148 to Nelson, and U.S. Pat. No. 4,438,630 to Rowe disclose the use of molten salt for heat transfer purposes. Neither of the references however, discloses using molten salt to transfer heat from a solar central receiver. Nelson uses the salt to store heat released by exhaust gases derived from the combustion of gaseous products in a coal gasification process so that the energy can be utilized to generate increased electrical power during peak demand periods. The Rowe reference is directed to a co-generating steam supply system which utilizes a molten salt heat transfer fluid for utilizing the steam produced by the first unit for maintaining selected component operating temperatures in the second unit during periods when the second unit is not producing steam. The transporting of heat from a central receiver is not mentioned by either of the references.

Central receiver power systems are capable of generating large amounts of electrical energy. To provide such power, central receiver systems usually include an array of thousands of individually steered flat reflectors or mirrors and a central receiver on top of a tower. Such arrays are normally referred to as a heliostat field, while the individual reflectors are normally referred to as heliostats. The heliostat field redirects radiant solar energy to the receiver. The receiver collects and converts the radiant solar energy to thermal energy. Such a system is disclosed in U.S. Pat. No. 4,466,423 to Dolan et al.

The instant invention makes it possible to use a central receiver on a smaller scale than that contemplated for production solely through the use solar energy while still achieving enhanced energy production with associated cost savings.

SUMMARY OF THE INVENTION

It is an object of the instant invention to provide a power plant utilizing solar energy which is commercially advantageous to build.

It is a further object of the instant invention to provide a hybrid, (gas powered with solar assist), power plant which recognizes the current cheapness of fossil fuels while allowing for future solar expansion.

It is an additional object of the invention to provide a solar central receiver to produce sufficiently high temperatures for use in a high efficiency combined cycle power plant.

It is a further object of the invention to provide a power plant with selective solar input which reduces the amount of natural gas required for plant operation.

The instant invention relates to a combined cycle power plant with a hybrid central receiver. The power plant includes a gas turbine for driving a first electric generator for producing electrical power, and a steam turbine operated off the exhaust gases of the gas turbine for driving a second electric generator for producing additional electric power. The gas turbine portion of the combined cycle plant includes a combustion chamber or generator for heating air and fuel provided to the turbine section, and a gas compressor for compressing the air provided to the combustion chamber. An air heater is provided between the compressor and the combustion chamber. The air heater derives the thermal energy used to heat the air from a central receiver which receives solar radiation from the sun which radiation is reflected to the receiver by a heliostat array. The solar radiation is converted to thermal energy by the central receiver. The thermal energy is transferred to the air heater through the use of a molten salt transfer medium. That is, the central receiver heats the salt in its molten state as it passes in tubes or pipes through the receiver. The tubes conduct the molten salt to the air heater where the thermal energy is used to heat the air therein. This preheating of the air results in fuel efficiencies as well as providing sufficient heat for combined cycle operation.

The invention further contemplates the method of utilizing solar energy in a combined cycle plant along with a fluid heat transfer medium.

DESCRIPTION OF THE PREFERRED EMBODIMENT

Figure 1:
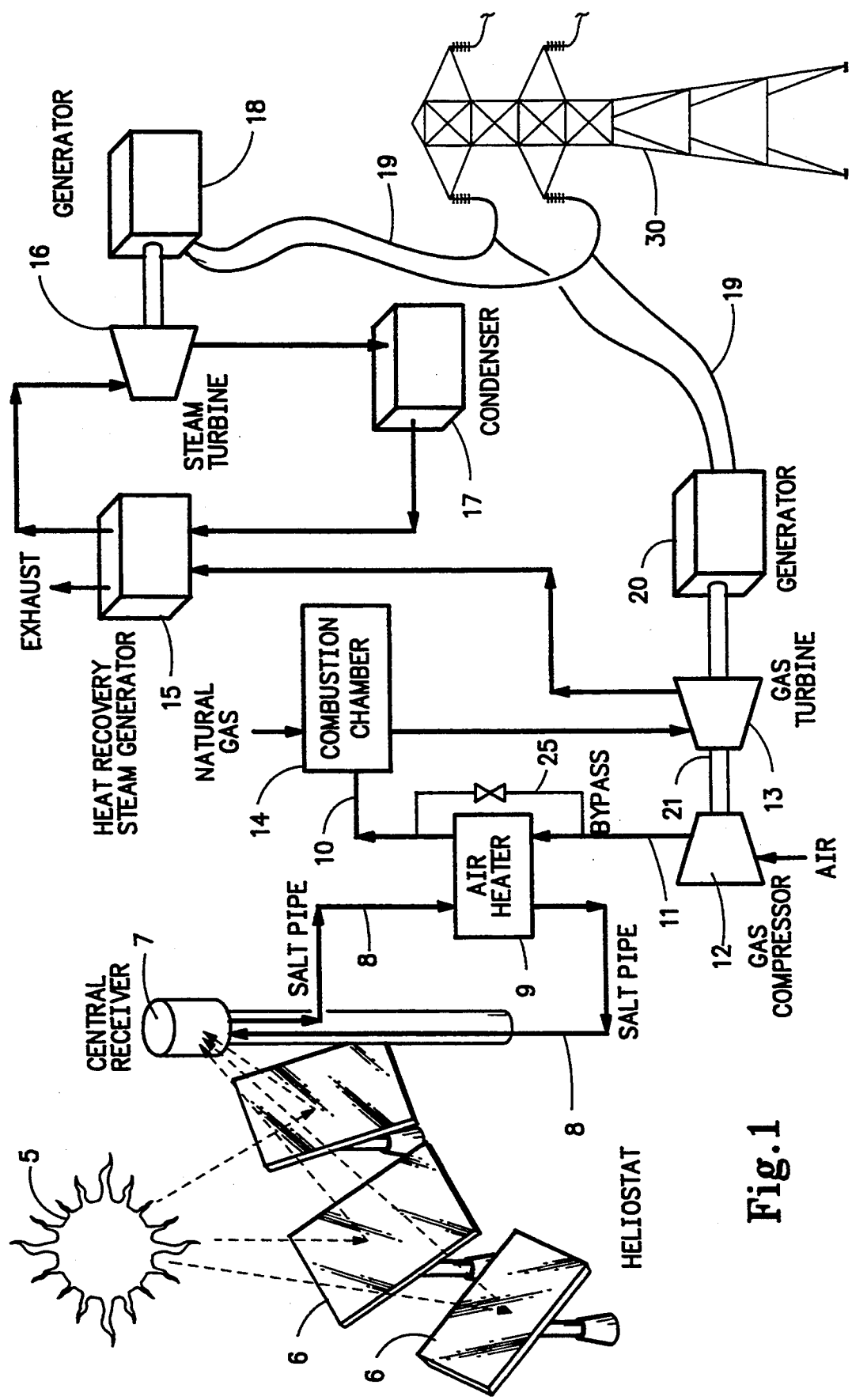
FIG. 1 is a block diagram showing the power plant of the instant invention.

FIG. 1 shows a typical combined cycle power plant with the additional features for added fuel efficiencies in accordance with the instant invention. The combined cycle power plant includes a gas turbine section 13 of a gas cycle, a heat recovery steam generator 15, and steam turbine 16. The gas compressor 12 of the gas cycle is coupled to the gas turbine section 13 by means of shaft 21. The gas turbine 13 is coupled to drive an electric generator 20 to produce electrical power which is disseminated through distribution wires 19, carrier towers 30, or other well known means. The gas compressor 12 receives ambient air from an air inlet as shown. A combustion chamber 14 heats compressed gas from the gas compressor and supplies it to the turbine section 13 in a known manner. The combustion chamber receives natural gas as fuel as shown.

The instant invention is further directed to the addition of an air heater 9 along with suitable heat transfer medium, to conduct thermal energy between a solar central receiver and the air heater. These features will be referred to in greater detail later in the description.

The heat recovery steam generator 15 receives excess heat from the gas turbine 13 in the form of hot exhaust gases. As is well known in the art, the heat recovery steam generator 15 typically includes three heat exchange sections, a superheater section, an evaporator section, and a preheater section each with an inlet and an outlet. As is well known, exhaust gases flow over the superheater section, then over the evaporator section and lastly over the preheater section. Additional heat exchange sections may also be provided. Superheated steam is directed through the steam turbine 16 which drives electrical generator 18. Electrical power produced from the generator 18 is distributed through wires 19 and towers 30 or by other well known distribution methods.

For efficient use of a combined cycle plant it is desirable that sufficiently high temperatures be achieved to have waste heat that is utilized by the steam turbine. The instant invention achieves sufficient waste heat from the gas turbine to utilize the highly efficient combined cycle configuration. A solar powered combustion air preheater between the gas turbine cycle compressor and combustion chamber provides heat which is used in both the gas turbine and in the steam generator. The solar powered combustion air preheater further achieves improved fuel efficiencies for the combined cycle of the plant by providing solar heated combination air preheat.

The air preheater of the instant invention includes a heliostat collector comprising individual heliostats or reflectors 6, each individually steered for rotation about its respective elevational axis and azimuthal axis to track the sun 5. The heliostats or reflectors 6 direct the received solar radiation to a tube-type or other well known central receiver 7 which is typically mounted on a tower 4. The receiver 7 collects and converts the radiant solar energy to thermal energy, as is well known, and such thermal energy heats salt contained in pipes or tubes 4. The resulting molten salt is used as a heat transfer medium.

The heat transfer medium preferably uses a nitrate salt, such as sodium nitrate or potassium nitrate although carbonate salts, such as sodium carbonate, potassium carbonate or lithium carbonate can be used. A molten metal such as sodium metal can also be used as the fluid heat transfer medium. The receiver supplies molten salt in a range from 500°–1100° F. for nitrate salts or in a range from 750°–1650° F. for carbonate salts to a combustion preheater or air heater 9 between the gas turbine cycle compressor 12 and combustion chamber 14.

The air in the air heater 9 can be heated by the molten salt by indirect or direct contact by any well known method, but in the preferred embodiment a simple tinned heat exchanger is used. That is, the molten salt remains inside the transfer tubes while the air to be heated is located outside the tubes. The heat from the molten salt is transferred through the tubes to the air. This preheated air is then directed through ducting 10 to the combustion chamber or generator 14. The addition of the preheated air reduces the amount of natural gas which is required by the gas combustion chamber. However, the combined cycle system can still operate without the air preheating for maximum flexibility of operation. A bypass pipe 25 with associated valves as is well known, is provided around the air heater so that the plant can operate at maximum efficiency during periods when the solar heat is not available.

The combined system of the instant invention has distinct and important advantages over an exclusively solar system. The first advantage is that the central receiver will not have to be built on such a large scale since combined-cycle equipment is economic in smaller sizes as compared to steam turbine equipment alone. For example, a viable stand-alone solar system would require almost twenty times as many heliostats as the combined system of the instant invention. This would result in considerable construction savings as well as savings as to energy costs per kilowatt hour.

The system of the instant invention also takes advantage of the relative cheap cost of natural gas while preparing for increased use of solar technology in the event the cost for such gas increases.

Also, the system of the instant invention uses inexpensive salts although molten metal can be used. The molten salt is a very good heat transfer medium, thus permitting the central receiver and air heater to be small in size. The salt also has low vapor pressure, which minimizes corrosion if the proper temperature range is maintained.

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow.

We claim:

1. A hybrid combined cycle power plant comprising
   a) a gas cycle comprising a gas turbine section for driving a first electric generator for producing electrical power, said gas turbine section producing exhaust gases, a combustion chamber for heating air provided to the gas turbine section, and a gas compressor for compressing air provided to the combustion chamber, and means for conducting compressed air from the gas compressor to the combustion chamber,
   b) a steam turbine operated off the exhaust gases of the gas turbine for driving a second electric generator for producing electrical power,
   c) an air heater for heating the air as it is conducted between the gas compressor and the combustion chamber,
   d) a central receiver for generating thermal energy in response to radiation received from the sun; and
   e) a liquid heat transfer medium comprising molten salt for transferring the thermal energy produced by the central receiver to the air heater to heat the air between the gas compressor and the combustion chamber.

2. The power plant of claim 1 further comprising tube means to conduct said molten salt from said central receiver to said air heater and back to said central receiver.

3. The power plant of claim 2 wherein said tube means containing said molten salt passes through said air heater to heat the air contained therein.

4. The power plant of claim 1 wherein said molten salt is at a temperature from 500° to 1650° F.

5. The power plant of claim 1 further comprising a plurality of heliostats to reflect the radiation from the sun onto the central receiver.

6. A method of operating a hybrid power plant comprising the steps of
   a) providing a gas turbine for driving an electric generator for production of electrical power;
   b) providing a solar central receiver;
   c) providing a plurality of reflecting surfaces to direct solar radiation from the sun to the central receiver;
   d) converting the solar radiation received by the central receiver into thermal heat;
   e) providing a molten salt liquid heat transfer medium to transfer the thermal energy from the central receiver to an air heater;
   f) providing the air heater with compressed air from an air compressor;
   g) transferring the molten salt medium to the air heater to heat the air in the air heater;
   h) transporting the heated air to a combustion chamber to mix the preheated air with fuel for operating the gas turbine.

7. The method of claim 6 wherein the gas turbine produces exhaust gases and further comprising the step of transporting such exhaust gases to a steam turbine for additional electric power production.

8. In a combined cycle power plant having a gas turbine cycle with a combustion chamber, and a steam turbine, which receives the exhaust gases of the gas turbine, the improvement comprising
   a) a central receiver for receiving solar radiation from the sun and converting the solar radiation to thermal energy;
   b) an air heater for heating air before it enters the combustion chamber of the gas turbine cycle; and
   c) a liquid medium for comprising molten salt for conducting the thermal energy from the central receiver to the air heater, wherein such thermal energy is used to heat the air in the air heater before it enters the combustion chamber of the gas turbine cycle.

9. In the combined cycle power plant of claim 8 further comprising a plurality of heliostats for directing solar radiation from the sun to the central receiver.

10. A hybrid power plant comprising
    a) a gas turbine system having a gas compressor, a combustion chamber, and a gas turbine connected to a generator for electrical power production wherein said gas compressor compresses intake air transported to the combustion chamber, and the combustion chamber mixes and combusts the air plus intake fuel for operation of the gas turbine;
    b) an air heater between the combustion chamber and the compressor to heat the compressed air from the compressor;
    c) a central receiver for receiving solar radiation from the sun and converting the solar radiation to thermal energy;
    d) a liquid transfer medium comprising molten salt for transferring the thermal energy from the central receiver to the air heater, wherein the air in the air heater is heated by the transferred thermal energy from the central receiver.

11. The hybrid power plant of claim 10 further comprising a plurality of heliostats to direct the solar radiation to the central receiver.

12. The hybrid power plant of claim 10 wherein said gas turbine produces exhaust gases and further comprising
    a) a heat recovery steam generator for receiving the exhaust gases from the gas turbine and a steam turbine connected to the heat recovery steam generator for producing additional electrical power.

13. A hybrid combined cycle power plant comprising
    a) a gas cycle comprising a gas turbine section for driving a first electric generator for producing electrical power, said gas turbine section producing exhaust gases, a combustion chamber for heating air provided to the gas turbine section, and a gas compressor for compressing air provided to the combustion chamber, and means for conducting compressed air from the gas compressor to the combustion chamber.

b) a steam turbine operated off the exhaust gases of the gas turbine for driving a second electric generator for producing electrical power, c) an air heater for heating the air as it is conducted between the gas compressor and the combustion chamber, d) a central receiver for generating thermal energy in response to radiation received from the sun; and e) A liquid heat transfer medium comprising metal in its molten state for transferring the thermal energy produced by the central receiver to the air heater wherein the molten meatal heats the air between the gas compressor and the combustion chamber.

* * * * *